United States Patent

Rudish et al.

[11] Patent Number: 5,493,306
[45] Date of Patent: Feb. 20, 1996

[54] PHASED ARRAY ANTENNA SYSTEM TO PRODUCE WIDE-OPEN COVERAGE OF A WIDE ANGULAR SECTION WITH HIGH DIRECTIVE GAIN AND MODERATE CAPABILITY TO RESOLVE MULTIPLE SIGNALS

[75] Inventors: Ronald M. Rudish, Commack; Scott F. Hall, Plainview, both of N.Y.

[73] Assignee: Eaton Corporation, Cleveland, Ohio

[21] Appl. No.: 94,265

[22] Filed: Aug. 28, 1987

[51] Int. Cl.⁶ .............................. H01Q 3/22; H01Q 3/36
[52] U.S. Cl. ......................... 342/371; 342/372; 342/375
[58] Field of Search .................................. 342/368, 371, 342/372, 373, 375, 376

[56] References Cited

U.S. PATENT DOCUMENTS

| | | | |
|---|---|---|---|
| 3,631,503 | 12/1971 | Tang et al. | 342/371 |
| 4,277,787 | 7/1981 | King | 342/371 |
| 4,652,879 | 3/1987 | Radish et al. | 342/371 |

Primary Examiner—John B. Sotomayor
Attorney, Agent, or Firm—Oldham, Oldham & Wilson Co.

[57] ABSTRACT

A phased array antenna system capable of scanning at rates faster than the information rate of signals being received to prevent the loss of information during the scanning process. The phased array is configured to add the capability to provide moderate multi-dimensional separation of multiple signals and to eliminate the sensitivity loss due to sampling usually encountered with such rapid-scan systems. The array antenna system is comprised of the means to form multiple, time sequenced responses, each response corresponding to a different beam of sensitivity. The beams scan the full coverage sector and together with each other form a contiguous set of beams that both fill the coverage sector at any one time and also synchronously scan the full coverage sector. The beams are differentially delayed to permit the beam responses from any particular incident signal to be added in unison, giving rise to a compressed pulse whose time of occurrence is related to the signal angle of incidence. The means for beam addition selectively forms a coherent sum at only one of its multiplicity of output ports, the particular port being a periodic function of the signal frequency. The ambiguities which arise in frequency measurement capabilities due to the periodicity are resolved by auxiliary means for coarse frequency measurement, however, the ambiguities do degrade frequency resolution of multiple signals. This arrangement retains the wide-open angular reception characteristics of a wide-beam or omnidirectional antenna, while exhibiting the gain and angular resolution of a multi-beam phased array antenna, and most of the frequency resolution avail able from a channelized receiver.

4 Claims, 1 Drawing Sheet

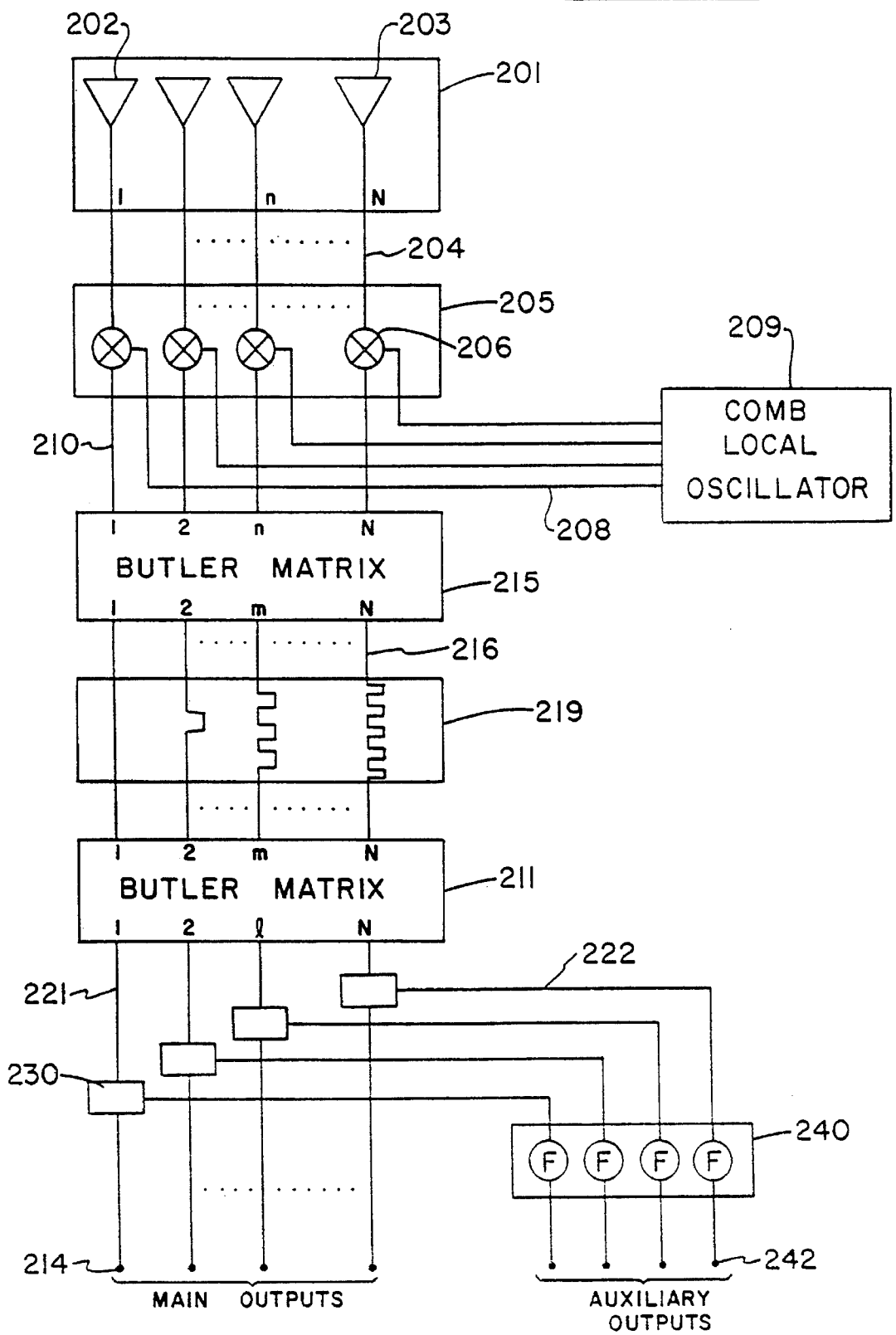

PHASED ARRAY ANTENNA SYSTEM TO PRODUCE WIDE-OPEN COVERAGE OF A WIDE ANGULAR SECTION WITH HIGH DIRECTIVE GAIN AND MODERATE CAPABILITY TO RESOLVE MULTIPLE SIGNALS

TECHNICAL FIELD

This invention relates to electronically scanned receiving antenna systems which scan at rates faster than the information rate of the signals being processed and, more particularly, to improvements in the signal combining subsystem of such systems to simultaneously achieve high values of directive gain and separation of multiple signals based on frequency, time-of-arrival and direction-of-arrival.

In the future, it is expected that the increased deployment of radars, in general, and of high PRF pulse doppler radars, in particular, will lead to a microwave signal environment which is dense in the time domain as well as in the frequency and spatial domains. The signal environment might be further complicated if there is increased use of emitters which pseudo-randomly frequency hop and/or pseudo-randomly stagger PRF's. This will make it increasingly desirable to sort emissions by direction-of-arrival (DOA), preferably on an individual pulse basis to maintain 100 percent probability of intercept. It will also be desirable to be able to separate individual pulse signals in at least two or three dimensions, such as DOA, frequency and time, simultaneously. This would make it possible to make unambiguous measurements of the frequencies of multiple signals which overlap in time and are within the same DOA resolution cell, It would likewise enable more accurate estimates of DOA for multiple signals which overlap in time and are within the same frequency resolution cell.

There will also be applications (ELINT, for example) in which the crowded signal environment is less likely to be a problem than the trend toward less detectable emissions (more highly supressed sidelobes, spread spectrum coding, etc.). In these applications, it would be desirable to obtain increased sensitivity via antenna directivity, but without having up 100 percent probability of detection.

Conceptually, existing technology provides a prior art means by which multi-dimensional signal separation and directional gain could be accomplished while maintaining 100 percent probability of intercept. A multiple beam antenna, such as a linear array and Butler matrix combination, could be connected to multiple sophisticated receivers, one for each output (beamport) of the Butler matrix. The receivers would have to be of the channelized or of the compressive type if frequency resolution and 100 percent probability of intercept are to be obtained.

A more hardware efficient method of obtaining high-gain multidimensional signal separation while maintaining 100% probability of intercept is provided by our U.S. Pat. No. 4,652,879 entitled "Phased Array Antenna System To Produce Wide-Open Coverage of a Wide Angular Sector with High Directive Gain and Strong Capability to Resolve Multiple Signals."

It is the purpose of the present invention to overcome practical limitations of the prior art solution described in U.S. Pat. No. 4,652,879 by presenting a method of reducing the member of output ports and thus the required number of envelope detectors and post-detection processors which would normally be attached to these output ports.

DISCLOSURE OF INVENTION

It is therefore an object of the present invention to provide an array antenna system capable of scanning through its complete coverage sector within the time period of the shortest pulse expected to be received, thereby maintaining the same high probability of intercepting such a signal as can be achieved with a single wide-beamwidth element of the array.

It is another object of the present invention to achieve the gain available from an N element array by recovering the signal loss which occurs in the arrays of other systems due to sampling the signal during only a portion of its time of presence.

Another object of the invention is to provide multidimensional resolution of multiple incident signals, sorting them by their time-of-arrival, direction-of-arrival and frequency.

It is yet another object of the present invention to provide the ability to determine the frequencies of multiple incident signals and the ability to determine their direction-of-arrival commensurate with the narrow beamwidth achievable with a full N element array.

Another object of the present invention is to gain the advantages of the above objects using fewer components than are required for multiple beam antenna systems that require separate complete receivers for each beam, such as the prior art system of FIG. 1 of U.S. Pat. No. 4,652,879.

Another object of the present invention is to gain the advantages of the above objects using fewer outputs than required for earlier array antenna systems such as the invention described in U.S. Pat. No. 4,652,879.

in general, an apparatus for adding the capability to separate multiple signals and for eliminating the sampling loss of signal energy in systems having a coverage sector through which the antenna system scans multiple beams at a rate that is faster than the information rate being received, comprises: (a) a linear phased array antenna comprising a row formed of a plurality of antenna elements, one of said antenna elements at one end of the row being designated the first element, while the remaining elements are designated by succeeding numbers in arithmetic progression across the row of antenna elements, and the antenna elements being considered as being positioned in the azimuth plane for reference purposes; (b) means for forming a plurality of beams of sensitivity coupled to said antenna elements, said plurality of beams of sensitivity being equal in number to the number of antenna elements in said row, the beams being contiguous and considered as lying in the azimuth plane for reference purposes, with each being generally evenly spaced from the adjacent beams in $\sin \theta$ space, where $\theta$ is the angle away from broadside in the azimuthal plane, the spacing between beam center directions in $\sin \theta$ space being generally proportional to the reciprocal of the number of antenna elements, and the beams, taken together to form a larger composite beam, span the entire azimuth coverage sector: (c) means coupled to said antenna elements for synchronously scanning each of the beams over the entire coverage sector, the beams maintaining their relative positions adjacent one another in $\sin \theta$ space during scanning, the scanning being carried out periodically at a rate that is at least twice as fast as the highest information rate being received; (d) means coupled to said antenna elements for accepting signals received by each beam and differentially delaying said beam signals to use their modulation envelopes to respond in unison to a single emitting source at a particular azimuth angle within the sector coverage of the antenna system: (e) means for coherently combining said beam signals after said signals have been differentially delayed, said means for combining being arranged to cause coherent addition selectively at different output ports of said combiner for different signal frequencies; and (f) means for measurement of the approximate frequency of said combined beam signals for eliminating ambiguities in determination of signal frequency.

BRIEF DESCRIPTION OF THE DRAWINGS

For a better understanding of the invention, reference should be had to the following drawing wherein:

FIG. 1 is a block diagram of a phased array antenna and receiver front-end, illustrating the present invention.

BEST MODE FOR CARRYING OUT THE INVENTION

The present invent i, on overcomes the practical limitations of prior art multiple beam antenna systems that require separate receivers and provides all of the advantages; of the aforementioned objectives simultaneously with a single configuration.

The antenna/receiver system of the present invention creates a set of contiguous beams of sensitivity which are scanned through a designated coverage sector within the time period of the shortest emitter pulse. Such rapid scan is obtained by heterodyne techniques; it results in a predictably compressed pulse (as in the case of a compressive receiver) whose time of occurrence is directly related to the emitter azimuth location.

The present invention avoids sampling loss by using different beams to sample the incident signal continuously during its entire time or presence. As a result, the present invention can yield a sensitivity improvement of N times (where N is the number of array elements) relative to that of the prior implementations which involved the scanning of a single beak. These prior implementations an incident pulse is sampled by the system for only a fraction of its width as the single beam sweeps by its incidence direction; this limits system sensitivity since only a fraction of the available pulse energy is delivered to the antenna/receiver output.

The manner of beam combination utilized in the present, invention results naturally in a narrow bandwidth channelization of signals in accordance with their frequency, in effect, doing the fine-grain filtering required in a high resolution channelized receiver without requiring the use of narrow-band filters.

To clearly illustrate various novel aspects of the current invention, a specific example is taken in which an N element linear array incorporates the invention. This embodiment of the invention is shown in FIG. 1 which contains a block diagram of an antenna and receiver front end. The component elements shown in FIG. 1 comprise a linear array of N antenna elements 201, an end antenna element 202 and an nth element 203, N equal-length transmission lines 204 which connect elements 201 to N heterodyne mixers 205, an nth mixer 206, N equal length transmission lines 208 which connect mixers 205 to a comb local oscillator 209, N equal length transmission lines 210 which connect the mixers 205 to first Butler matrix 215, N equal length transmission lines 216 which connect first Butler matrix 215 to a set of N delay lines 219 of progressively different length, N transmission lines 220 which connect the delay lines 219 to a second Butler matrix 211, and N equal length transmission lines 221 which connect the second Butler matrix 211 with N signal couplers 230, each signal coupler having two outputs, the more strongly coupled output 214 being a main output of the present invention and more weakly coupled output being connected via transmission line 222 to a coarse frequency meter 240, each coarse frequency meter having an auxiliary output port 242. Amplifiers could be inserted before and after the mixers in a practical implementation but they have been omitted from FIG. 1 because their presence is not required for the purpose of explaining the approach.

The present invention provides all the same capabilities as that describes in U.S. Pat. No. 1,652,879 although frequency resolution is provided to a lesser degree than previously; yet the present invention has fewer output ports and thus provides for more efficient post detection signal processing.

The current invention is an improvement, over that described in U.S. Pat. No. 4,652,879 for certain applications which require its particular mix of attributes.

FIG. 1 describes the first embodiment the invention. The diagram is similar to FIG. 2 of U.S. Pat. No. 4,662,870 except that the coarse channelizers of FIG. 2 have been deleted and N means for coarse frequency measurement designated by numeral 240 have been added. The latter devices 240 can be any of the many means for this purpose familiar to those in the art, including such frequency-to-voltage converters as frequency discriminators and radio detectors, frequency-to-time converters such as dispersive delay lines, and frequency-to-phase converter such as are used in "instantaneous frequently-measurement" (IFM) devices. The main outputs 214 of the system are used to detect signal presence and the information content of the received signals as well as to determine time of signal arrival and direction of signal arrival. The main outputs 214 also indicate with fine precision, the frequency of the incident signals. The outputs of the system labeled auxiliary outputs 242 in FIG. 1 are used to provide frequency indications with coarse precision for the purpose of eliminating ambiguities in frequency determination.

Operation of the system of FIG. 1, through the second IF Butler matrix, is the same as for that of FIG. 2 of U.S. Pat. No. 4,652,879. The outputs of the second IF Butler matrix contain signals which are cataloged by output port number in accordance with their frequency. Fine channelization is provided, the degree of fineness being equal to the beam sweep rate, as explained in U.S. Pat. No. 4,652,879. However, the signal cataloging is accordance with a periodic function of frequency so that multiple signals, spaced apart in frequency by N times the beam sweep rate, will appear at the same output port. This would present an ambiguity in frequency measurement and somewhat degrades the multiple-signal resolution capability unless means are provided to correct this deficiency. The coarse frequency meters 240 of the present invention are used to resolve the ambiguities in frequency measurement, while the moderate degradation of multiple-signal resolution is accepted as a reasonable price for having fewer output ports than that required for more complete multiple-signal resolution.

An alternative embodiment of the present invention deletes the coarse frequency meters and accomplishes their function of eliminating the frequency ambiguities in a manner analogous to the way in which staggered PRF's allow resolution of range ambiguities in pulse-doppler radar. In this embodiment of the present invention, multiple beam-scanning rates are used to achieve sets of response curves versus frequency which are staggered relative to each other. Then responses subject to each of the beam scanning rates are compared in an algorithm which resolves the frequency ambiguity. The multiple beam scanning rates may be achieved either with time multiplexing or by use of parallel processing. In the time multiplier case, scanning rates would be two or three times higher than in the parallel processing case to maintain 100 percent probability of intercept. In the latter case, the signals emerging from the individual antenna elements (or from the RF preamplifiers following the antenna elements if they are used) would be divided and applied to parallel systems (mixers through to second IF Butler matrix).

Alternative equivalent systems are considered within the scope of the invention. For example, alternative systems derived by the addition of a set of amplifiers prior to the mixing process or after the mixing process or the addition of preselector filters or attenuators or receiver/transmit duplexers or any other set of devices normally found in the front end of the receiver are considered with in the contemplations of the current invention because these devices do not alter the intent or the manner of operation of the invention, although to the extent that the transmission parameters of such devices fail to track each other, they can degrade performance.

All of the alternative equivalent forms of the invention have in common the following essence of the invention; the means to form multiple, time-sequenced outputs, each output corresponding to a different beam of sensitivity which scans the full coverage sector and together with the other outputs forms a contiguous set of such beams which both fill the coverage sector at any one time and scan the full coverage synchronously as a function of time; the means to differentially delay the time-sequenced outputs corresponding to an emitter at a fixed direction, so that the modulation envelopes of these outputs occur in unison; the means to coherently combine the time aligned outputs selectively at different output ports for different emitter frequencies; and the means to distinguish between non-simultaneous multiple outputs at a single output port form emitters having frequencies corresponding to grating lobe responses. Although an azimuth plane is used for reference purposes, the present invention is capable of functioning in the same manner regardless of the plane in which the antenna elements lie.

While in accordance with the patent statutes, only the best mode and preferred embodiment of the present invention has been presented in detail, for the true scope and breadth of the invention, reference should be had to the appended claims.

What is claimed is:

1. An apparatus for adding the capability to separate multiple signals and for eliminating the sampling loss of signal energy in systems having a coverage sector through which the antenna system scans multiple beams at a rate that is faster than the information rate being received, comprising:
   (a) a linear phased array antenna compressing a row formed of a plurality of antenna elements, one of said antenna elements at one end of the row being designated the first element, while the remaining elements are designated by succeeding numbers in arithmetic progression across the row of antenna elements, and the antenna elements being considered as being positioned in the azimuth plane for reference purposes;
   (b) by means for forming a plurality of beams of sensitivity coupled to said antenna elements, said plurality of beams of sensitivity being equal in number to the number of antenna elements in said row, the beams being contiguous and considered as lying in the azimuth plane for reference purposes, with each being generally evenly spaced from the adjacent beams in sin $\theta$ space, where $\theta$ is the angle away from broadside in the azimuthal plane, the spacing between beam center directions in sin $\theta$ space being generally proportional to the reciprocal of the number of antenna elements, and the beams, taken together to form a larger composite beam, span the entire azimuth coverage sector;
   (c) means coupled to said antenna elements for synchronously scanning each of the beams over the entire coverage sector, the beams maintaining their relative positions adjacent one another in sin $\theta$ space during, scanning, the scanning being carried out periodically at a rate that is at least twice as fast as the highest information rate being received;
   (d) means coupled to said antenna elements for accepting signals received by each beam and differentially delaying said beam signals to cause their modulation envelopes to respond in unison to a single emitting source at a particular azimuth angle to within the sector coverage of the antenna system;
   (e) means for coherently combining said beam signals after said signals have been differentially delayed, said means for combining being arranged to cause coherent addition selectively at different output ports of said combiner for different signal frequencies; and
   (f) means for measurement of the approximate frequency of said combined beam signals for eliminating ambiguities in determination of signal frequency.

2. An apparatus as in claim 1, further comprising:
   (a) a plurality of heterodyne mixers, equal in number to the number of antenna elements, each having an input port, an output port and a local oscillator port, each input port being coupled to a separate antenna element For frequency conversion of the signals received by said antenna elements, and each mixer being designated by the same number as the antenna element to which it is coupled;
   (b) means for generating a plurality of local oscillator signals equal in number to the number of mixers, each local oscillator signal being separately coupled to one of said plurality of mixers by way of its local oscillator port and each of said plurality of local oscillator signals assuming the same numerical designation as the mixer to which it is coupled, the frequency of each local oscillator signal being offset from that of the preceding one in the order of its arithmetic designation to order the frequencies of the local oscillators from the first to the last in a linear arithmetic progression with a common difference equal to the beam scanning rate, the means for generating the local oscillator signals producing coherently related local oscillator signals in that, at the same point in each cycle of the common difference frequency, the sinusoidal variations of the local oscillator signals simultaneously reach their peaks;
   (c) said means for forming a plurality of contiguous beams of sensitivity each designated by succeeding numbers in arithmetic progression in accordance with its position in the beam group, said means comprising an intermediate frequency beam-forming network having a plurality of input ports equal to the number of mixers, with each of said input ports being coupled to a separate output port of one of said mixers, and said intermediate frequency beam-forming network having a plurality of output ports equal to the number of beams, with each of said output ports being designated by the same number designation of the beam to which it couples;

(d) said means for differentially delaying a plurality of signals comprising a plurality of delay lines equal in number to the number of beams, each having an input port and an output port, each input port being coupled to an output of the beam-forming network, each delay line being designated by the same number as the beam-forming network output port to which it is coupled, the delay of each delay line being offset from that of the preceding one in the order of its arithmetic designation to order the delays of the delay lines from the first to the last in a linear arithmetic progression with a common difference equal to the reciprocal of the product of the number of beams times the beam scanning rate;

(e) said means for coherently combining a plurality of signals comprising a second intermediate-frequency beam-forming network having a plurality of input ports equal to the number of delay lines, with each of said input ports being coupled to the output port of one of said delay lines, and said second intermediate-frequency beam-forming network having a plurality of output ports equal to its number of input ports; and (f) said means for measurement of approximate frequency comprising a plurality of wave coupler and frequency meter pairs, each said pair comprising a wave coupler and a frequency meter, said pairs being equal in number to the number of output ports of the second intermediate-frequency beam-forming network each wave-coupler having an input port coupled to an output of said beam-forming network, each wave coupler having first and second output ports, said first wave-coupler output port providing a main system output port, said second wave-coupler output; port being connected to an RF input of the frequency meter, and an output of said frequency meter being an auxiliary system output.

3. A process for adding the capability to separate multiple signals and for eliminating the sampling loss of signal energy in antenna systems having a coverage sector through which the antenna system scans multiple beams at a rate that is faster than the information rate being received, comprising the steps of:

(a) providing a linear phased array antenna comprising a row formed of a plurality of antenna elements, one of said antenna elements at one end of the row being designated the first element, while the remaining elements are designated the succeeding numbers in arithmetic progression across the row of antenna elements, and the antenna elements being considered as being positioned in the azimuth plane for reference purposes;

(b) forming a plurality of beams of sensitivity coupled to said antenna elements, said plurality of beams of sensitivity being equal in number to the number of antenna elements in said row, the beams being contiguous and considered as lying in the azimuth plane for reference purposes, with each beam being generally evenly spaced from the adjacent beams in sin $\theta$ space, where $\theta$ is the angle away from broadside in the azimuthal plane, the spacing between beam center directions in sin $\theta$ space being generally proportional to the reciprocal of the number of antenna elements, and the beams, taken together to form a larger composite beam, span the entire azimuth coverage sector;

(c) differentially phase shifting signals received by said antenna elements at rates exceeding 4 $\pi$ radians per cycle of the highest frequency present in the information content of the incident electromagnetic wave for synchronously scanning each of the beams over the entire coverage sector, the beams maintaining their relative positions adjacent one another in sin $\theta$ space during scanning, the scanning being carried out periodically at a rate that is at least twice as fast as the highest information rate being received;

(d) accepting signals received by each beam and differentially delaying said beam signals to cause their modulation envelopes to respond in unison to a single emitting source at a particular azimuth angle within the sector coverage of the antenna system;

(e) accepting beam signals that have been differentially delayed and coherently combining said beam signals to cause coherent additions selectively at different output ports for different signal frequencies thereby providing a method for determination of signal frequency with fine precision; and;

(f) measuring the approximate frequency of the beam signals at each output post for eliminating ambiguities in determination of signal frequency.

4. A process as claimed in claim 3, further comprising the steps of:

(a) providing a plurality of heterodyne mixers, equal in number to the number of antenna elements, each having an input port, an output port and a local oscillator port, each input port being coupled to a separate antenna element for frequency conversion of the signals received by said antenna elements, and each mixer being designated by the same number as the antenna element to which it is coupled;

(b) providing means for generating a plurality of local oscillator signals equal in number to the number of mixers, each local oscillator signal being separately coupled to one of said plurality of mixers by way of its local oscillator port and each of said plurality of local oscillator signals assuming the same numerical designation as the mixer to which it is coupled, the frequency of each local oscillator signal being offset form that of the preceding one in the order of its arithmetic designation to order the frequencies of the local oscillators from the first to the last in s linear arithmetic progression with a common difference equal to the beam scanning rate, the means for generating the local oscillator signals producing coherently related local oscillator signals in that, at the same point in each cycle of the common difference frequency, the sinusoidal variations of the local oscillator signals simultaneously reach their peaks;

(c) providing said means for forming a plurality of contiguous beams of sensitivity each designated by succeeding numbers in arithmetic progression in accordance with its position in the beam group, said means comprising an intermediate frequency beam-forming network having a plurality of input ports equal to the number of mixers, with each of said input ports being coupled to a separate output port of one of said mixers, and said intermediate frequency beam-forming network having a plurality of output ports equal to the number of beams, with each of said output ports bearing designated by the same number designation of the beam to which it couples;

(d) providing said means for differentially delaying a plurality of signals comprising a plurality of delay lines equal in number to the number of beams, each having an input port and an output port, each input port being coupled to an output of the beam-forming network, each delay line being designated by the same number as the beam-forming network output port to which it is coupled, the delay of each delay line being offset from that of the preceding one in the order of its arithmetic designation to order the delays of the delay lines from the first to the last in a linear arithmetic progression with a common difference equal to the reciprocal of the product of the number of beams times the beam scanning rate;

(e) providing said means for coherently combining a plurality of signals comprising a second intermediate frequency beam-forming network having a plurality of input ports equal to the number of delay lines, with each of said input ports being coupled to the output port of one of said delay lines, and said second intermediate-frequency beam-forming network having a plurality of output ports equal to its number of input ports; and (f) providing said means for measurements of approximate frequency comprising a plurality of wave coupler and frequency meter pairs, each said pair comprising a wave coupler and a frequency meter, said pairs being equal in number to the number of output ports of the second intermediate-frequency beam-forming network, each wave-coupler having an input port coupled to an output of said beam-forming network, each wave coupler having first and second output ports, said first wave-coupler output port providing a main system output port, said second wave-coupler output port being connected to an RF input of the frequency meter, and an output of said frequency meter being an auxiliary system output.

* * * * *